United States Patent [19]
Peng et al.

[11] Patent Number: 5,974,535
[45] Date of Patent: Oct. 26, 1999

[54] METHOD AND SYSTEM IN DATA PROCESSING SYSTEM OF PERMITTING CONCURRENT PROCESSING OF INSTRUCTIONS OF A PARTICULAR TYPE

[75] Inventors: Chih-Jui Ray Peng, Plano, Tex.; Daniel Chen Chow, Hillsboro, Oreg.; Terence Matthew Potter; Paul Charles Rossbach, both of Austin, Tex.

[73] Assignee: International Business Machines Corporation, Armonk, N.Y.

[21] Appl. No.: 08/853,009

[22] Filed: May 9, 1997

[51] Int. Cl.$^6$ ........................................................ G06F 9/00
[52] U.S. Cl. ............................................................. 712/215
[58] Field of Search .................................. 712/215, 200, 712/205, 233

[56] References Cited

U.S. PATENT DOCUMENTS

| | | | |
|---|---|---|---|
| 4,901,233 | 2/1990 | Liptay | 364/200 |
| 5,134,561 | 7/1992 | Liptay | 395/425 |
| 5,651,125 | 10/1993 | Witt et al. | 395/394 |
| 5,721,855 | 3/1994 | Hinton et al. | 395/394 |

OTHER PUBLICATIONS

Gurindar Sohi, Instruction Issue Logic for High–Performance, Interruptible, Multiplt Functional Unit, Pipelined Computers, IEEE Transactions On Computers, vol. 39, No. 3 pp. 349–359, Mar. 1990.

*Primary Examiner*—David Y. Eng
*Attorney, Agent, or Firm*—Casimer K. Salys; Lisa B. Yociss; Andrew J. Dillon

[57] ABSTRACT

A method and system in a data processing system of permitting concurrent processing of multiple conditional branch instructions are disclosed. A condition register is established within the processing system. First and second conditional branch instructions are dispatched during a single cycle of the processing system. Prior to speculatively executing the first conditional branch instruction, a first copy of the condition register is stored. Prior to speculatively executing the second conditional branch instruction, a second copy of the condition register is stored. Multiple copies of the condition register are concurrently maintained so that the first and second conditional branch instructions may be concurrently processed during a single cycle of the processing system.

13 Claims, 9 Drawing Sheets

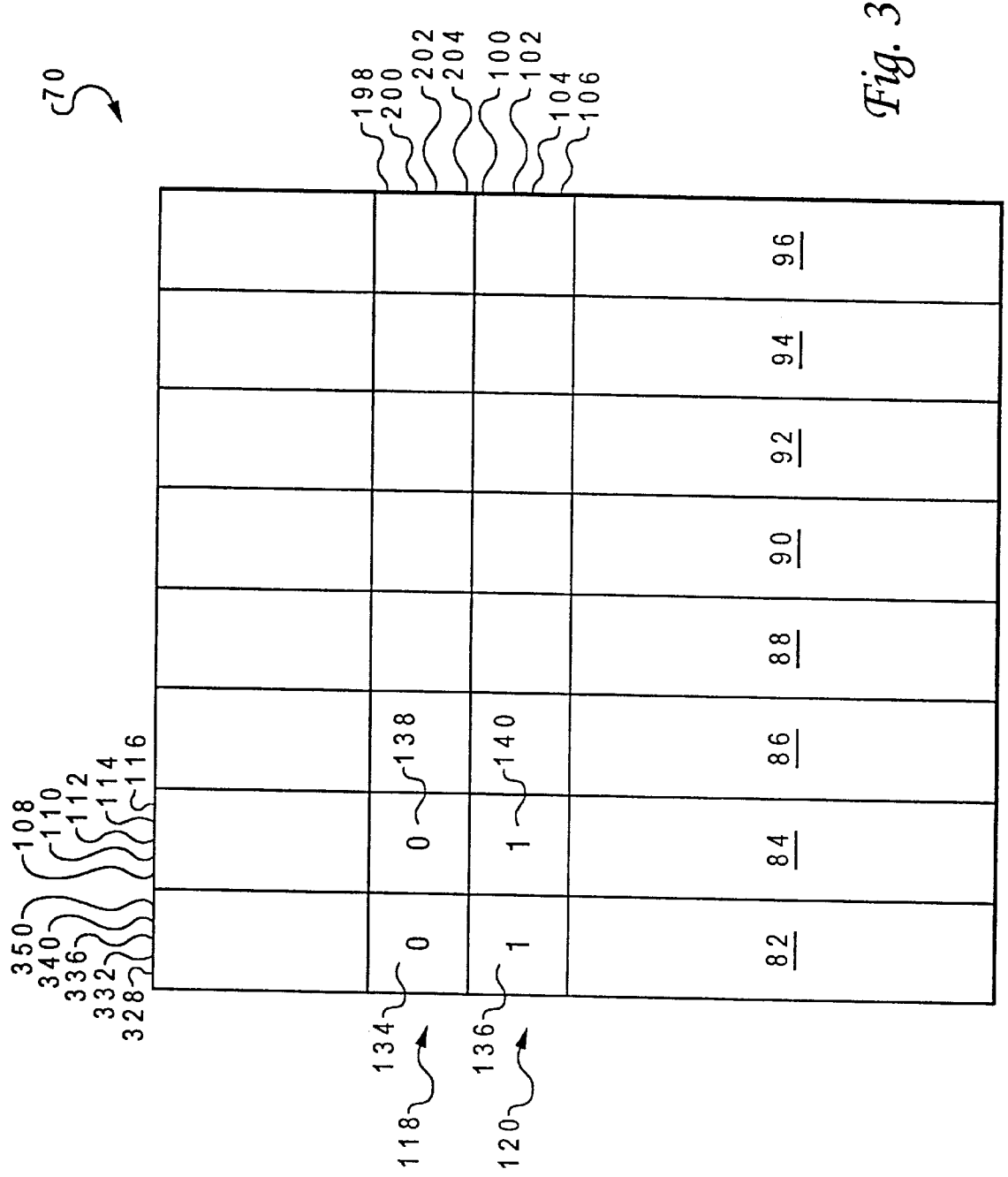

METHOD AND SYSTEM IN DATA PROCESSING SYSTEM OF PERMITTING CONCURRENT PROCESSING OF INSTRUCTIONS OF A PARTICULAR TYPE

BACKGROUND

1. Technical Field

The depicted illustrative embodiment relates to superscalar data processing systems, and in particular to concurrent processing of a particular type of instructions in a superscalar data processing system. Still more particularly, the depicted illustrative embodiment relates to establishing an array within which multiple statuses of a plurality physical registers are stored during a single clock cycle permitting concurrent processing of a plurality of instructions of a particular type.

2. Description of the Related Art

A superscalar data processing system is a data processing system which includes a microprocessor architecture which is capable of executing multiple instructions per clock cycle. In order to execute multiple instructions per clock cycle, multiple independent functional units that can execute concurrently are required.

The overlap of the fetching and decoding of one instruction with the execution of a second instruction is called pipelining. In pipelined superscalar data processing systems, care must be taken to avoid dependencies where multiple instructions are fetched, decoded, and executed in a single cycle.

There are three types of data dependencies. A read after write hazard occurs when an instruction tries to read a source before a previous instruction writes the source. A write after read hazard occurs when an instruction tries to write a destination before a previous instruction reads it. A write after write hazard occurs when an instruction writes a destination before a previous instruction writes it.

One solution to solving the dependence problem is to rename the logical registers associated with the instructions. By renaming the logical registers, each instruction within the cycle can be executed concurrently and correctly. A problem arises, however, when an instruction is a conditional branch instruction. Register renaming is a mechanism for dealing with these dependencies in a processor which executes instructions out-of-order. The target register associated with each instruction is renamed to a unique physical register. Thereby, the instructions may execute properly concurrently, and out-of-order.

A condition branch instruction is an instruction which specifies a conditional branch and the conditions that have to be satisfied for the conditional branch to occur. In order to speed execution of instructions, for each conditional branch, a prediction is made regarding whether the conditions will occur which will cause the branch. This prediction is made during the cycle during which the conditional branch is decoded, and prior to completing the execution of each conditional branch. In the event a conditional branch is predicted incorrectly, the state of all registers affected by the conditional branch must be restored to their states which existed just prior to encountering the conditional branch. Upon completion of execution of the instruction, if the branch instruction was correctly predicted, the stored register values are discarded.

Therefore a need exists for a method and system in a superscalar data processing system to permit concurrent processing of a plurality of instructions of a particular type within a single clock cycle.

SUMMARY

It is therefore one object of the depicted illustrative embodiment to provide an improved superscalar data processing system.

It is another object of the illustrative embodiment to provide a method and system for concurrent processing of a particular type of instructions in a superscalar data processing system.

It is yet another object of the illustrative embodiment to provide a method and system for establishing an array within which multiple statuses of a plurality of physical registers are stored during a single clock cycle permitting concurrent processing of a plurality of instructions of a particular type.

The foregoing objects are achieved as is now described. A method and system in a superscalar data processing system are disclosed for permitting concurrent processing of a plurality of instructions of a particular type. The superscalar data processing system includes multiple instructions to be processed in a single clock cycle, a plurality of logical register names, and a plurality of physical registers. The multiple instructions include a plurality of instructions of a particular type. Each of the multiple instructions are associated with one of the logical register names and with one of the physical registers. An array is established which includes a plurality of entry fields. Each of the multiple instructions is associated with a different one of the entry fields. Immediately prior to a processing of each of the plurality of instructions, an entry is created which includes an indication of a status of the physical registers for each of the plurality of instructions. For each of the plurality of instructions, the entry is stored in the entry field associated with the instruction.

The above as well as additional objectives, features, and advantages of the illustrative embodiment will become apparent in the following detailed written description.

BRIEF DESCRIPTION OF THE DRAWINGS

The novel features are set forth in the appended claims. The illustrative embodiment itself, however, as well as a preferred mode of use, further objectives and advantages thereof, will best be understood by reference to the following detailed description of an illustrative embodiment when read in conjunction with the accompanying drawings, wherein:

FIG. 3 depicts a pictorial representation of a snapshot array included within superscalar data processing system 10 in accordance with the method and system of the illustrative embodiment;

DETAILED DESCRIPTION OF ILLUSTRATIVE EMBODIMENT

An exemplary embodiment of the present invention and its advantages are better understood by referring to FIGS. 1–6D of the drawings, like numerals being used for like and corresponding parts of the accompanying drawings.

Figure 1:
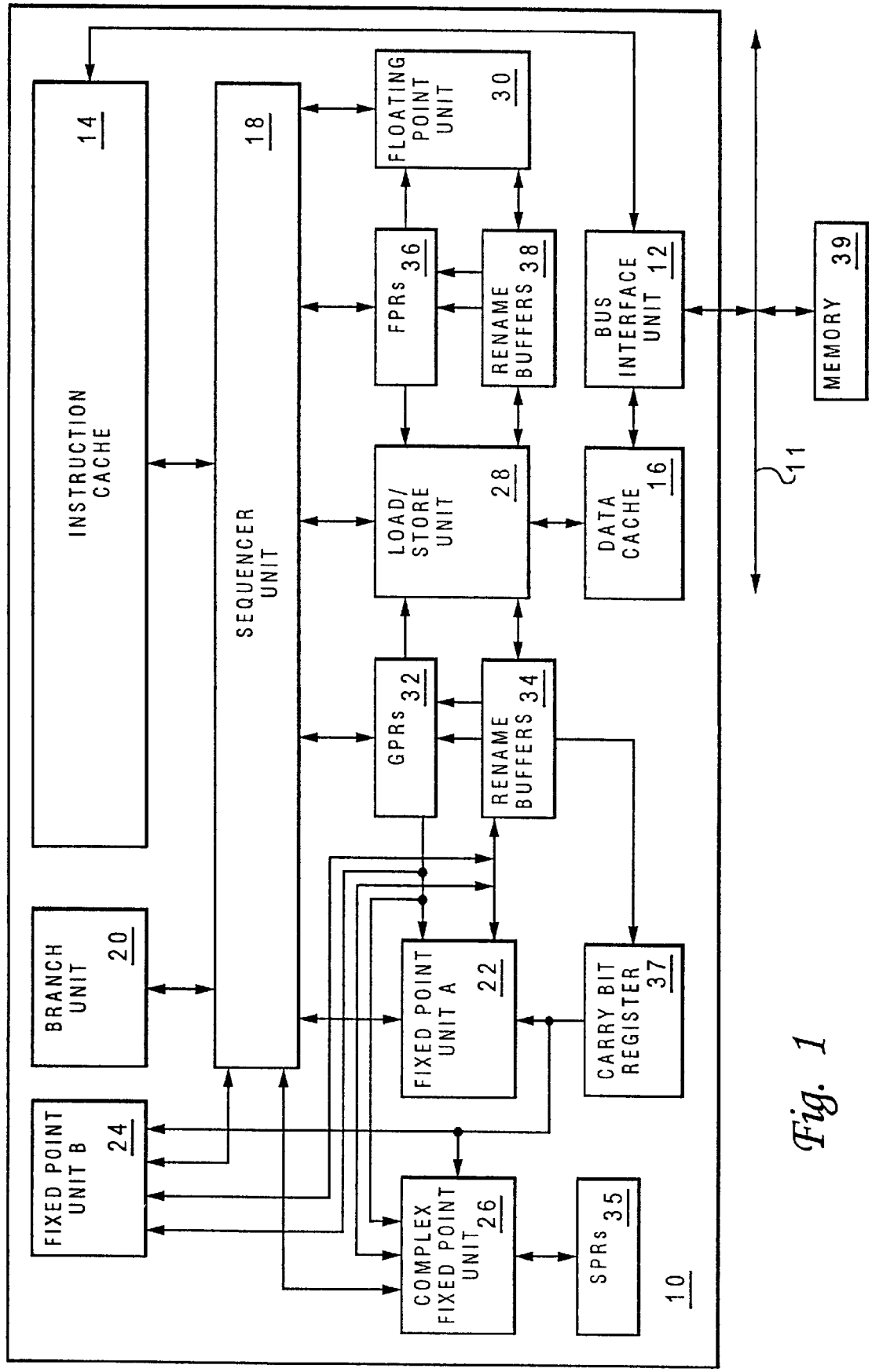
FIG. 1 depicts a high level block diagram of a superscalar data processing system 10 which may be utilized to implement the method and system of the illustrative embodiment.

FIG. 1 is a block diagram of a processor 10 system for processing information according to the preferred embodiment. In the preferred embodiment, processor 10 is a single integrated circuit superscalar microprocessor. Accordingly, as discussed further herein below, processor 10 includes various units, registers, buffers, memories, and other sections, all of which are formed by integrated circuitry. Also, in the preferred embodiment, processor 10 operates according to reduced instruction set computer ("RISC") techniques. As shown in FIG. 1, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18, in the preferred embodiment the execution circuitry of processor 10 includes multiple execution units, namely a branch unit 20, a branch target address cache 21, a fixed point unit A ("FXUA") 22, a fixed point unit B ("FXUB") 24, a complex fixed point unit ("CFXU") 26, a load/store unit ("LSU") 28, and a floating point unit ("FPU") 30. FXUA 22, FXUB 24, CFXU 26, and LSU 28 input their source operand information from general purpose architectural registers ("GPRs") 32 and fixed point rename buffers 34. Moreover, FXUA 22 and FXUB 24 input a "carry bit" from a carry bit ("CA") register 37. FXUA 22, FXUB 24, CFXU 26, and LSU 28 output results (destination operand information) of their operations for storage at selected entries in fixed point rename buffers 34. Also, CFXU 26 inputs and outputs source operand information and destination operand information to and from special purpose registers ("SPRs") 35.

FPU 30 inputs its source operand information from floating point architectural registers ("FPRs") 36 and floating point rename buffers 38. FPU 30 outputs results (destination operand information) of its operation for storage at selected entries in floating point rename buffers 38.

In response to a Load instruction, LSU 28 inputs information from data cache 16 and copies such information to selected ones of rename buffers 34 and 38. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction, LSU 28 inputs information from a selected one of GPRs 32 and FPRs 36 and copies such information to data cache 16.

Sequencer unit 18 inputs and outputs information to and from GPRs 32 and FPRs 36. From sequencer unit 18, branch unit 20 inputs instructions and signals indicating a present state of processor 10. In response to such instructions and signals, branch unit 20 outputs (to sequencer unit 18) signals indicating suitable memory addresses storing a sequence of instructions for execution by processor 10. In response to such signals from branch unit 20, sequencer unit 18 inputs the indicated sequence of instructions from instruction cache 14. If one or more of the sequence of instructions is not stored in instruction cache 14, then instruction cache 14 inputs (through BIU 12 and system bus 11) such instructions from system memory 39 connected to system bus 11.

In response to the instructions input from instruction cache 14, sequencer unit 18 selectively dispatches the instructions to selected ones of execution units 20, 22, 24, 26, 28, and 30. Each execution unit executes one or more instructions of a particular class of instructions. For example, FXUA 22 and FXUB 24 execute a first class of fixed point mathematical operations on source operands, such as addition, subtraction, ANDing, ORing and XORing. CFXU 26 executes a second class of fixed point operations on source operands, such as fixed point multiplication and division. FPU 30 executes floating point operations on source operands, such as floating point multiplication and division.

As information is stored at a selected one of rename buffers 34, such information is associated with a storage location (e.g. one of GPRs 32 or CA register 42) as specified by the instruction for which the selected rename buffer is allocated. Information stored at a selected one of rename buffers 34 is copied to its associated one of GPRs 32 (or CA register 42) in response to signals from sequencer unit 18. Sequencer unit 18 directs such copying of information stored at a selected one of rename buffers 34 in response to "completing" the instruction that generated the information. Such copying is called "writeback".

As information is stored at a selected one of rename buffers 38, such information is associated with one of FPRs 36. Information stored at a selected one of rename buffers 38 is copied to its associated one of FPRs 36 in response to signals from sequencer unit 18. Sequencer unit 18 directs such copying of information stored at a selected one of rename buffers 38 in response to "completing" the instruction that generated the information.

Processor 10 achieves high performance by processing multiple instructions simultaneously at various ones of execution units 20, 22, 24, 26, 28, and 30. Accordingly, each instruction is processed as a sequence of stages, each being executable in parallel with stages of other instructions. Such a technique is called "pipelining". In a significant aspect of the illustrative embodiment, an instruction is normally processed as six stages, namely fetch, decode, dispatch, execute, completion, and writeback.

In the fetch stage, sequencer unit 18 selectively inputs (from instructions cache 14) one or more instructions from one or more memory addresses storing the sequence of instructions discussed further hereinabove in connection with branch unit 20, sequencer unit 18, and branch target address cache 21.

In the decode stage, sequencer unit 18 decodes up to four fetched instructions.

In the dispatch stage, sequencer unit 18 selectively dispatches up to four decoded instructions to selected (in response to the decoding in the decode stage) ones of execution units 20, 22, 24, 26, 28, and 30 after reserving rename buffer entries for the dispatched instructions' results (destination operand information). In the dispatch stage, operand information is supplied to the selected execution units for dispatched instructions. Processor 10 dispatches instructions in order of their programmed sequence.

In the execute stage, execution units execute their dispatched instructions and output results (destination operand information) of their operations for storage at selected entries in rename buffers 34 and rename buffers 38 as discussed further hereinabove. In this manner, processor 10 is able to execute instructions out-of-order relative to their programmed sequence.

In the completion stage, sequencer unit 18 indicates an instruction is "complete". Processor 10 "completes" instructions in order of their programmed sequence.

In the writeback stage, sequencer 18 directs the copying of information from rename buffers 34 and 38 to GPRs 32 and FPRs 36, respectively. Sequencer unit 18 directs such copying of information stored at a selected rename buffer. Likewise, in the writeback stage of a particular instruction, processor 10 updates its architectural states in response to the particular instruction. Processor 10 processes the respective "writeback" stages of instructions in order of their programmed sequence. Processor 10 advantageously merges an instruction's completion stage and writeback stage in specified situations.

In the illustrative embodiment, each instruction requires one machine cycle to complete each of the stages of instruction processing. Nevertheless, some instructions (e.g., complex fixed point instructions executed by CFXU 26) may require more than one cycle. Accordingly, a variable delay may occur between a particular instruction's execution and completion stages in response to the variation in time required for completion of preceding instructions.

Rename buffers 34, or physical registers, are utilized during a register renaming process. One of physical registers 34 is selected and then associated with a logical register name for a particular instruction. Therefore, for the particular instruction, the logical register name has been renamed to the associated physical register.

Superscalar data processing system 10 may concurrently process multiple instructions per clock cycle. For purposes of this specification, superscalar data processing system 10 may process up to four (4) instructions per clock cycle. Those skilled in the art will recognize that superscalar data processing system 10 may concurrently process any number of instructions per clock cycle. The multiple instructions may include at least two particular types of instructions. The first particular type of instruction is a condition register setting instruction. The second particular type of instruction is a condition register reading instruction. A condition register is one method which may be utilized for evaluating conditional branch conditions. Condition register reading instructions are conditional branch instructions which must read and depend on data stored in the condition register by a condition register setting instruction. A branch unit 20 is provided which may be utilized in the processing of branch instructions.

A combination of both condition register setting instructions and condition register reading instructions may be received in a single clock cycle to be concurrently decoded and executed. These instructions in this particular combination may all utilize the same bit of the condition register. Some of the instructions will be writing data to a bit of the condition register while other instructions must read the data stored in that bit. Therefore, it is critical to proper system operation that correct condition register data be utilized by each condition register reading instruction. In order to permit concurrent processing of these instructions, each of the multiple instructions has an associated logical register name which is renamed to a selected physical register.

For conditional branch instructions, or condition register reading instructions, a prediction of a result of each conditional branch is made when the multiple instructions are decoded. Once condition setting instructions have completed execution, a comparison is made between the prediction and the actual result. If the prediction was correct, no modification to the condition register needs to be made. However, in the event the conditional branch instruction was predicted incorrectly, the condition register must be modified to reflect the state of the condition register prior to the execution of the conditional branch instruction. A "snapshot" of the condition register must be taken just prior to executing the conditional branch instruction. Once the state of the condition register is stored, the conditional branch instruction may complete execution. For systems which permit storage of only one snapshot of the condition register per cycle, while the conditional branch instruction is completing execution, processing of other instructions must stop. When the conditional branch instruction has completed execution, if the prediction was correct, processing of other instructions may then continue. If the prediction was incorrect, the condition register is restored and processing of other instructions may then continue.

For superscalar data processing systems, a plurality of conditional branch instructions may need to be processed concurrently. A plurality of "snapshots" of the condition register must be stored in order to permit concurrent processing of conditional branch instructions within a single cycle. The state of the condition register must be stored just prior to execution of each conditional branch instruction. The illustrative embodiment describes a method and system for generating and maintaining multiple copies of the condition register so that if any of the multiple conditional branches decoded in the single clock cycle have been predicted incorrectly, the correct state of the condition register just prior to the processing of the instruction including the incorrectly predicted conditional branch can be restored.

FIGS. 2A–2D illustrates a pictorial representation of a condition register rename array included within superscalar data processing system 10 in accordance with the method and system of the illustrative embodiment. Each of the multiple instructions has an associated logical register name. Several of the multiple instructions may be associated with the same logical register name. Therefore, to permit concurrent processing of these instructions, the logical register names of each of these instructions must be renamed to a physical register. After each condition setting instruction to be processed during a single clock cycle has been dispatched, condition register rename array 40 will be updated and will now include the logical register name associated with the instruction, the physical register to which the logical register name has been renamed, condition data if a result is available, a valid bit indicating whether the condition data is valid, and a status bit indicated whether this physical register was the most recently allocated physical register associated with the logical register name associated with this instruction.

The following example will be used to illustrate the method and system of the illustrative embodiment. Instruction 1 is received first and is a condition register setting instruction writing data to condition register 0. Instruction 2 is received second and is a condition register setting instruction also writing to condition register 0. Instruction 3 is received third and is a condition register reading instruction reading and depending on condition register 0. Instruction 4 is received fourth and is also a condition register reading instruction reading and depending on condition register 0. Instructions 1–4 are each associated with a logical register name. In this example, Instructions 1–4 are each associated with logical register name "condition register 0".

Upon receipt of Instruction 1, the logical register name associated with Instruction 1 has been renamed to physical register 7. Therefore, Instruction 1 is associated with a logical register name of "condition register 0" and a physical register of "7". Upon receipt of Instruction 2, the logical register name associated with Instruction 2 has been renamed to physical register 8. Instruction 2 is then associated with logical register name "condition register 0" and physical register "8". Instruction 3 is associated with condition register 0 and physical register 8. Instruction 4 is associated with a logical register name of "condition register 0" and a physical register of "8".

Figure 2A:
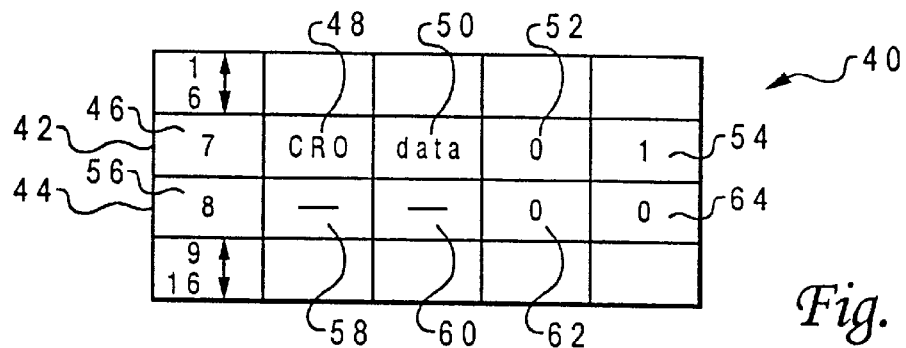
FIGS. 2A–2D illustrates a pictorial representation of a condition register rename array included within superscalar data processing system 10 in accordance with the method and system of the illustrative embodiment.

FIG. 2A illustrates a condition register rename array 40 having a plurality of entry fields, such as entry fields 42 and 44. Each entry field includes a physical register field, a logical register name field, a data field, a valid field, and a status field. For example, entry 42 includes physical register field 46, logical register name field 48, data field 50, valid field 52, and status field 54. Similarly, entry 44 includes physical register field 56, logical register name field 58, data field 60, valid field 62, and status field 64. FIG. 2A illustrates the state of condition register rename array 40 after initiating processing of Instruction 1 and before initiating processing Instructions 2–4. Therefore, FIG. 2A illustrates an array which includes an indication of a status of each physical register after processing of Instruction 1 but before processing of Instructions 2–4.

Entry field 42 is associated with Instruction 1. A "7" is included in physical register field 46 because Instruction 1 has been renamed to and is now associated with physical register 7. "CR0" is included in logical register name field 48 because Instruction 1 is associated with logical register name "condition register 0", or "CR0". Condition data is included in data field 50. A "0" is included in valid field 52 indicating that the data in data field 50 is not yet valid. When Instruction 1 has completed processing, data field 50 will be updated to represent this by including a "1" in valid field 52. Status field 54 includes a "1" because physical register 7 is the most recently allocated physical register associated with condition register 0 (CR0).

Figure 2B:
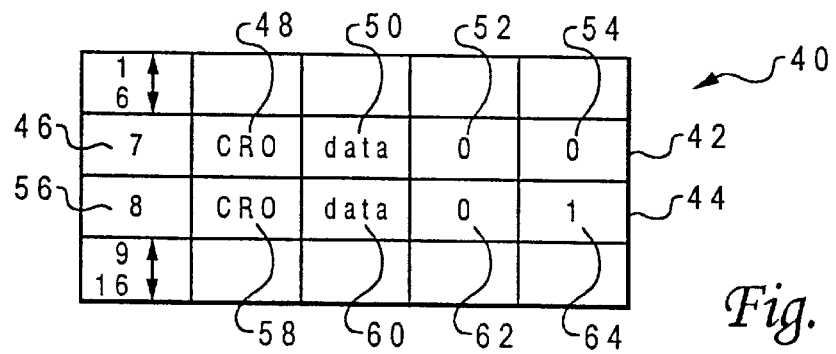

FIG. 2B illustrates the state of condition register rename array 40 after initiating processing of Instruction 2 and before initiating processing of Instructions 3–4. Entry field 42 is associated with Instruction 1. A "7" is included in physical register field 46 because Instruction 1 has been renamed to and is now associated with physical register 7. "CR0" is included in logical register name field 48 because Instruction 1 is associated with logical register name "condition register 0", or "CR0". Data is included in data field 50. A "0" is included in valid field 52 indicating that the data in data field 50 is not yet valid. Status field 54 includes a "0" because physical register 7 is no longer the most recently allocated physical register associated with condition register 0 (CR0).

Entry field 44 is associated with Instruction 2. An "8" is included in physical register field 56 because Instruction 2 has been renamed to and is now associated with physical register 8. "CR0" is included in logical register name field 58 because Instruction 2 is associated with logical register name "condition register 0", or "CR0". Data is included in data field 60. A "0" is included in valid field 62 indicating that the data in data field 60 is not yet valid. Status field 64 includes a "1" because physical register 8 is the most recently allocated physical register associated with condition register 0 (CR0).

Figure 2C:
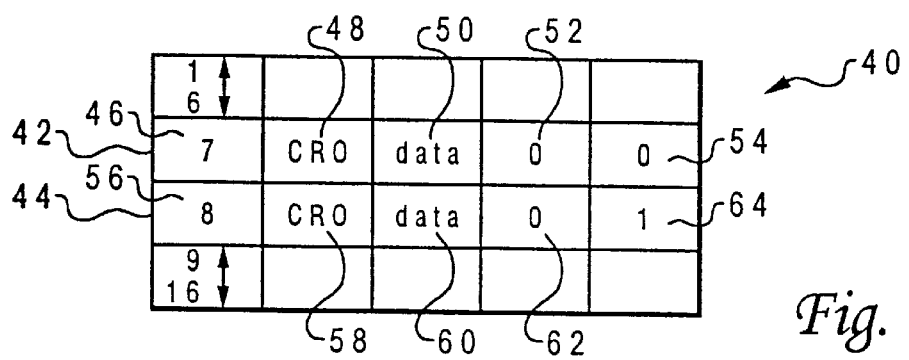
Figure 2D:
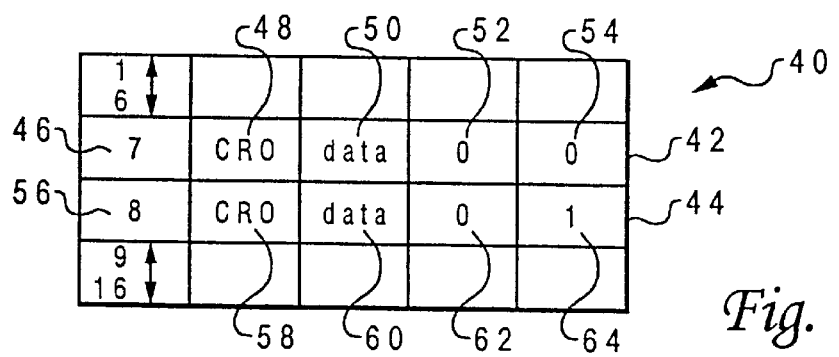

FIG. 2C illustrates the state of condition register rename array 40 after initiating processing of Instruction 3 and before initiating processing of Instruction 4. FIG. 2D illustrates the state of condition register rename array 40 after initiating processing of Instruction 4. Since Instructions 3 and 4 are conditional branch instructions and do not set the condition register, the state of condition register rename array 40 will not change after initiating processing of either Instruction 3 or 4. Instructions 3 and 4 read the entries stored in entry fields of the condition register rename array.

FIG. 3 depicts a pictorial representation of an array 70 included within superscalar data processing system 10 in accordance with the method and system of the illustrative embodiment. The state of the condition register must be stored immediately prior to execution of each conditional branch instruction. Immediately prior to executing Instruction 3, the status field associated with each physical register must be stored. In addition, because Instruction 4 is also a conditional branch, immediately prior to executing Instruction 4, the status field associated with each physical register must also be stored.

The status fields associated with each condition branch instruction to be executed in a single clock cycle are stored in array 70. Array 70 includes a plurality of entry fields, such as entry fields 82, 84, 86, 88, 90, 92, 94, and 96. The entry fields are associated with the status fields of array 40 as they exist before any dispatching conditional branch instruction. In the example given, entry field 82 is associated with status before instruction 3 and entry field 84 before instruction 4.

Array 70 also includes a plurality of rows. Each of the plurality of rows is associated with a different one of the physical registers. In the illustrative embodiment, there are sixteen (16) physical registers. Therefore, there are sixteen (16) rows included within array 70. For example, array 70 includes row 118 which is associated with physical register 7, and row 120 which is associated with physical register 8.

Row 118 includes element 134 in which is stored the status from status field 54, from FIG. 2B, and element 138 in which is stored the status from status field 54 from FIG. 2C. Row 120 includes element 136 in which is stored the indication of status from status field 64 from FIG. 2B, and element 140 in which is stored the status from status field 64 from FIG. 2C. The status fields 54 and 64 for FIGS. 2A, 2B, 2C, and 2D are all generated in parallel when the four instructions are dispatching and all input into array 70. The column enable signals, described below, select only the status snapshots from before conditional branches to store in the entry fields of array 70.

Figure 4:
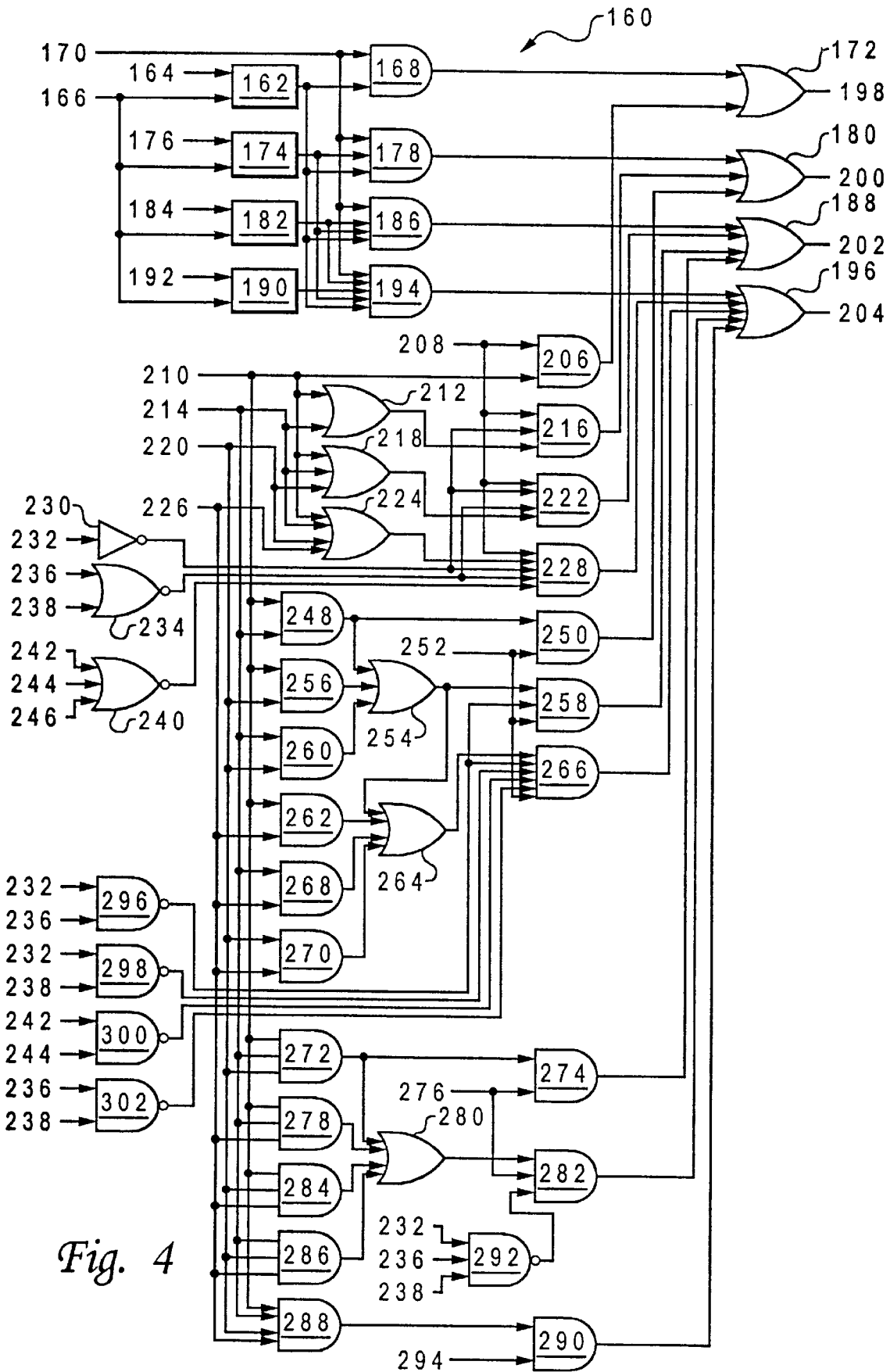
FIG. 4 depicts a logic diagram for generating the status of a physical register included within superscalar data processing system 10 in accordance with the method and system of the illustrative embodiment.

FIG. 4 depicts a logic diagram 160 for generating an indication of status of a single physical register included within superscalar data processing system 10 in accordance with the method and system of the illustrative embodiment. Those skilled in the art will recognize that a logic diagram such as diagram 160 must be included for each physical register included within superscalar data processing system 10. Since the illustrative embodiment includes sixteen physical registers, there must be sixteen different implements of logic diagram 160 to generate an indication of status for all physical registers.

Block 162 receives as inputs signals 164 and 166. Block 162 generates a logical "1" if signals 164 and 166 are not equal. Block 162 generates a logical "0" if signals 164 and 166 are equal. The output of block 162 is received as an input into AND gate 168. AND gate 168 also receives as an input signal 170. The output of AND gate is input into OR gate 172. Block 174 receives as inputs signals 176 and 166. Block 174 generates a logical "1" if signals 176 and 166 are not equal. Block 174 generates a logical "0" if signals 174 and 166 are equal. The output of block 174 is received as an input into AND gate 178. AND gate 178 also receives as an input signal 170, and the output of block 162. The output of AND gate 178 is input into OR gate 180. Block 182 receives as inputs signals 184 and 166. Block 182 generates a logical "1" if signals 184 and 166 are not equal. Block 182 generates a logical "0" if signals 184 and 166 are equal. The output of block 182 is received as an input into AND gate 186. AND gate 186 also receives as an input signal 170, the output of block 174, and the output of block 162. The output of AND gate 186 is input into OR gate 188. Block 190 receives as inputs signals 192 and 166. Block 190 generates a logical "1" if signals 192 and 166 are not equal. Block 190 generates a logical "0" if signals 192 and 166 are equal. The output of block 190 is received as an input into AND gate 194. AND gate 194 also receives as an input signal 170, the output of block 182, the output of block 174, and the output of block 162. The output of AND gate 194 is input into OR gate 196.

OR gate 172 generates output 198. OR gate 180 generates output 200. OR gate 188 generates output 202. OR gate 196 generates output 204. Output 198 is the status of the physical register of diagram 160 to be stored in a status field of condition register rename array 40 after receipt of Instruction 1. For example, if the physical register of diagram 160 is physical register 7, output signal 198 will be entered into field 54 of condition register rename array 40 of FIG. 2A. In the example from above, the value of output signal 198 is a logical "1". Output 200 is the status of the physical register of diagram 160 to be stored in a status field of condition register condition register rename array 40 after Instruction 2. For example, if the physical register of diagram 160 is physical register 7, output signal 198 will be entered into field 54 of condition register rename array 40 of FIG. 2B. In the example from above, the value of output signal 198 is a logical "0". Output 202 is the status of the physical register of diagram 160 to be stored in a status field of condition register rename array 40 after receipt of Instruction 3. If the physical register of diagram 160 is physical register 7, output signal 202 will be entered into field 54 of condition register rename array 40 of FIG. 2D. In the example from above, the value of output signal 202 is a logical "0". Output 204 is the status of the physical register of diagram 160 to be stored in a status field of condition register rename array 40 after Instruction 4. For example, if the physical register of diagram 160 is physical register 7, output signal 204 will be entered into field 54 of condition register rename array 40 of FIG. 2D. In the example from above, the value of output signal 204 is a logical "0".

Signal 170 is the binary value of the status of the physical register of diagram 160. For example, for diagram 160 for physical register 7, signal 170 will be the value of the status of physical register 7. For diagram 160 for physical register 8, signal 170 will be the value of the status of physical register 8.

Signal 164 is the logical register name associated with Instruction 1. Signal 176 is the logical register name associated with Instruction 2. Signal 184 is the logical register name associated with Instruction 3. Signal 192 is the logical register name associated with Instruction 4. Signal 166 is the logical register name stored in field 48 immediately prior to the receipt of Instruction 1.

AND gate 206 receives as inputs signals 208 and 210. Signal 206 is also received by AND gates 216, 222, and 228 as inputs. The output of AND gate 206 is received as an input into OR gate 172. OR gate 212 receives as inputs signals 210 and 214, and generates an output received by AND gate 216. The output of AND gate is received as an input into OR gate 200. OR gate 218 receives as inputs signals 210, 214, and 220, and generates an output received by AND gate 222. AND gate 222 generates an output received by OR gate 202. OR gate 224 receives as inputs signals 210, 214, 220, and 226 and generates an output received by AND gate 228. AND gate 228 generates an output received as an input by OR gate 204. Inverter 230 receives as an input signal 232 and generates an output received by AND gates 216, 222, and 228. NOR gate 234 receives as inputs signals 236 and 238 and generates an output received by AND gates 222 and 228. NOR gate 240 receives as inputs signals 242, 244, and 246 and generates an output received by AND gate 228.

Signal 210 is a write enable signal for Instruction 1. If Instruction 1 is a condition register writing instruction, signal 210 is a logical "1". Otherwise, signal 210 is a logical "0". Signal 214 is a write enable signal for Instruction 2. If Instruction 2 is a condition register writing instruction, signal 214 is a logical "1". Otherwise, signal 214 is a logical "0". Signal 220 is a write enable signal for Instruction 3. If Instruction 3 is a condition register writing instruction, signal 220 is a logical "1". Otherwise, signal 220 is a logical "0". Signal 226 is a write enable signal for Instruction 4. If Instruction 4 is a condition register writing instruction, signal 226 is a logical "1". Otherwise, signal 226 is a logical "0". Signal 208 is an allocation signal which is a logical "1" if Instruction 1 has selected the physical register associated with the logic diagram 160 to be renamed. For example, if logic diagram 160 is the diagram for physical register 7, signal 208 will be a logical "1" if Instruction 1 is associated with physical register 7. Otherwise, signal 208 will be a logical "0". As another example, if logic diagram 160 is the diagram for physical register 3, signal 208 will be a logical "1" if Instruction 1 is associated with physical register 3. Otherwise signal 208 will be a logical "0".

Signals 232, 236, 238, 242, 244, and 246 are collision signals. Signal 232 is a logical "1" if the logical register name associated with Instruction 2 is the same as the logical register name associated with Instruction 1. Otherwise, it is a logical "0". Signal 236 is a logical "1" if the logical register name associated with Instruction 3 is the same as the logical register name associated with Instruction 1. Otherwise, it is a logical "0". Signal 238 is a logical "1" if the logical register name associated with Instruction 4 is the same as the logical register name associated with Instruction 1. Otherwise, it is a logical "0". Signal 242 is a logical "1" if the logical register name associated with Instruction 3 is the same as the logical register name associated with Instruction 2. Otherwise, it is a logical "0". Signal 244 is a logical "1" if the logical register name associated with Instruction 4 is the same as the logical register name associated with Instruction 2. Otherwise, it is a logical "0". Signal 246 is a logical "1" if the logical register name associated with Instruction 4 is the same as the logical register name associated with Instruction 3. Otherwise, it is a logical "0".

AND gate 248 receives as its inputs signals 210 and 214 and generates an output received by AND gate 250. The output of AND gate 250 is received by OR gate 180. AND gate 250 also receives signal 252 as an input. Signal 252 is also received by AND gates 258 and 266 as inputs.

Signal 252 is an allocation signal which is a logical "1" if Instruction 2 has selected the physical register associated with the logic diagram 160 to be renamed. For example, if logic diagram 160 is the diagram for physical register 7, signal 252 will be a logical "1" if Instruction 2 is associated with physical register 7. Otherwise, signal 252 will be a logical "0".

The output of AND gate 248 is also received by OR gate 254 as an input. OR gate 254 is received by both AND gate 258 and OR gate 264 as inputs. AND gate 256 receives signals 210 and 220 as inputs and generates an output received by OR gate 254. AND gate 260 receives signals 214 and 220 as inputs and generates an output received by OR gate 254 as an input. AND gate 262 receives signals 210 and 226 as inputs and generates an output received by OR gate 264 as an input. OR gate 264 generates an output received by AND gate 266 as an input. AND gate 268 receives signals 214 and 226 as inputs and generates an output received by OR gate 264 as an input. AND gate 270 receives signals 220 and 226 as inputs and generates an output received by OR gate 264 as an input.

AND gate 272 receives signals 210, 214 and 226 as inputs and generates an output received by AND gate 274 as an input. AND gate 274 generates an output received by OR gate 202 as an input. AND gate also receives signal 276 as an input. Signal 276 is an allocation signal which is a logical "1" if Instruction 3 has selected the physical register associated with the logic diagram 160 to be renamed. For example, if logic diagram 160 is the diagram for physical register 7, signal 276 will be a logical "1" if Instruction 3 is associated with physical register 7. Otherwise, signal 276 will be a logical "0".

AND gate 278 receives signals 210, 214 and 226 as inputs and generates an output received by OR gate 280 as an input. OR gate receives the output of AND gates 272, 278, 284, 286, and 288 as inputs and generates an output received by AND gate 282. AND gate 284 receives signals 210, 220, and 226 as inputs and generates an output received by OR gate 280. AND gate 286 receives as inputs signals 214, 220, and 226 and generates an output received by OR gate 280. AND gate 288 receives signals 210, 214, 220, and 226 as inputs and generates an output received by AND gate 290 as an input. AND gate 290 also receives signal 294 as input. Signal 294 is an allocation signal which is a logical "1" if Instruction 4 has selected the physical register associated with the logic diagram 160 to be renamed. For example, if logic diagram 160 is the diagram for physical register 7, signal 276 will be a logical "1" if Instruction 4 is associated with physical register 7. Otherwise, signal 294 will be a logical "0".

NAND gate 292 receives as inputs signals 232, 236, and 238 and generates an output received by AND gate 282. AND gate 282 receives the output of NAND gate 292, the output of OR gate 280 and signal 276. AND gate 282 generates an output received by OR gate 196.

NAND gate 296 receives signals 232 and 236 as inputs and generates an output received by AND gates 258 and 266 as inputs. NAND gate 298 receives signals 232 and 238 as inputs and generates an output received by AND gate 266 as an input. NAND gate 300 receives signals 242 and 244 as inputs and generates an output received by AND gate 266 as an input. NAND gate 302 receives signals 236 and 238 as inputs and generates an output received by AND gate 266 as an input.

Figure 5:
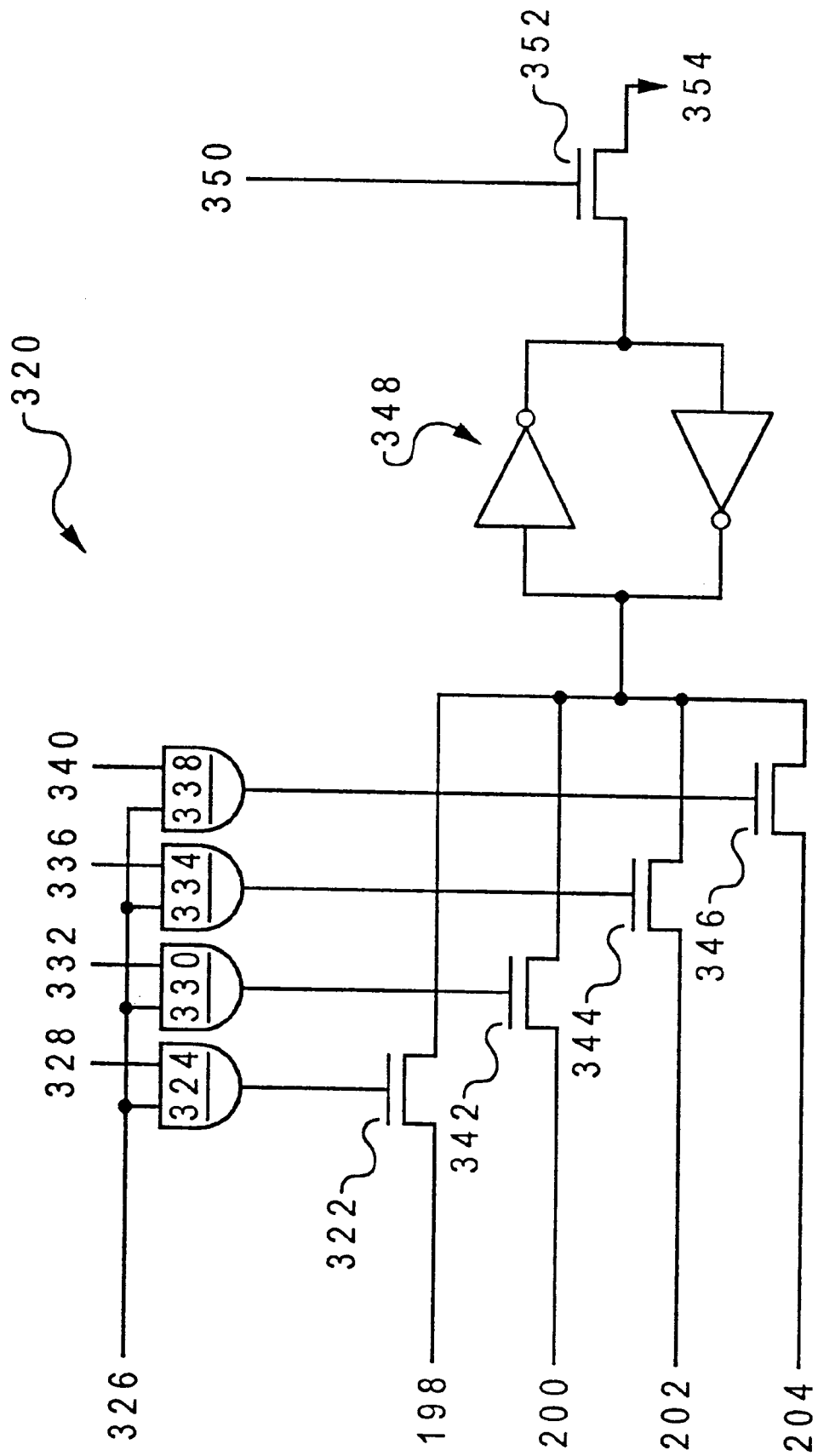
FIG. 5 illustrates a circuit for storing and restoring a status of physical registers in the condition register rename array of FIG. 2 included within superscalar data processing system 10 in accordance with the method and system of the illustrative embodiment.
Figure 6A:
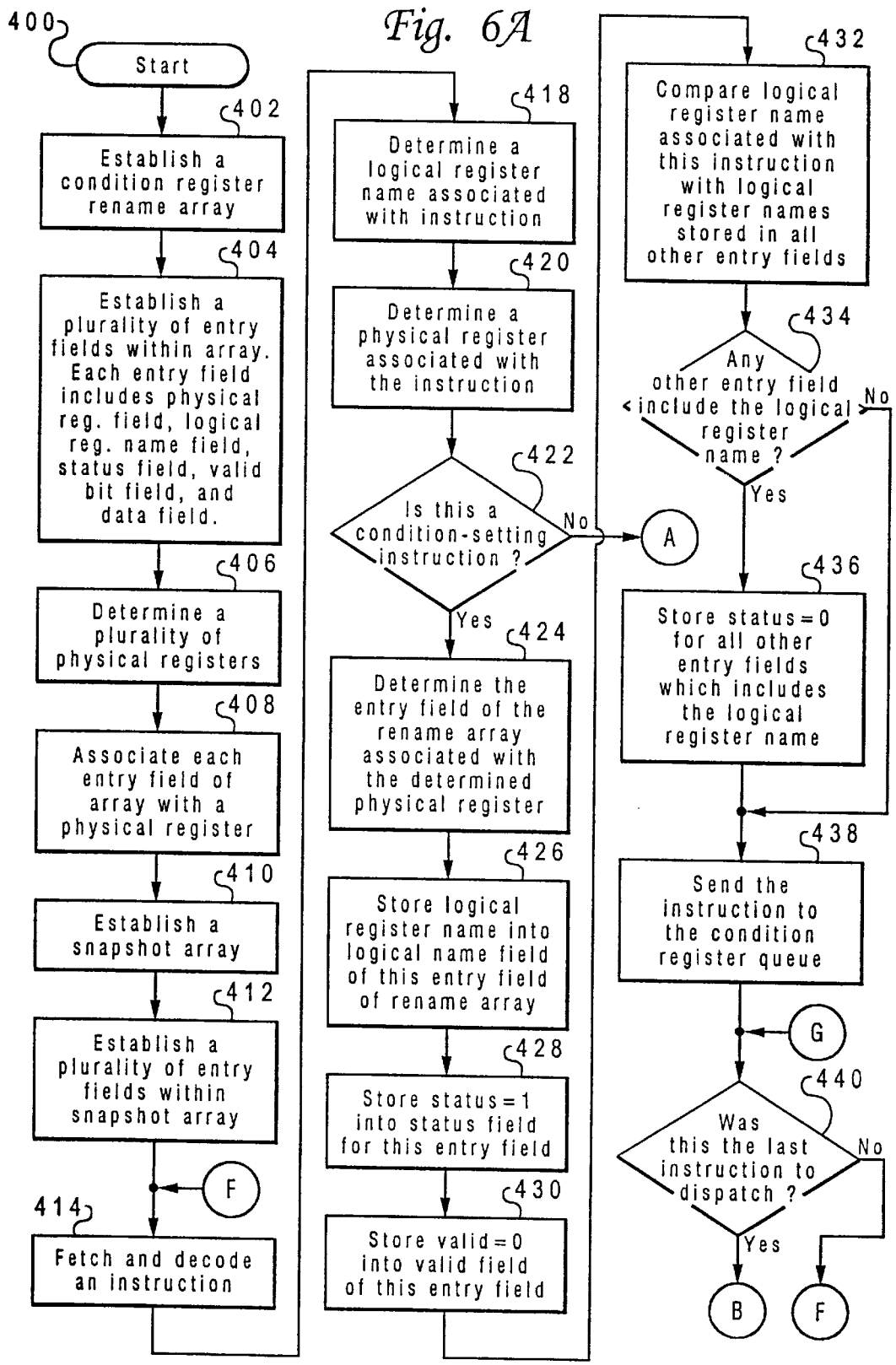
FIGS. 6A–6D together are a high level flow chart depicting the establishment of a snapshot array and the storing of a status of a plurality of physical registers in the snapshot array in order to permit concurrent processing of a plurality of instructions of a particular type in accordance with the method and system of the illustrative embodiment.
Figure 6B:
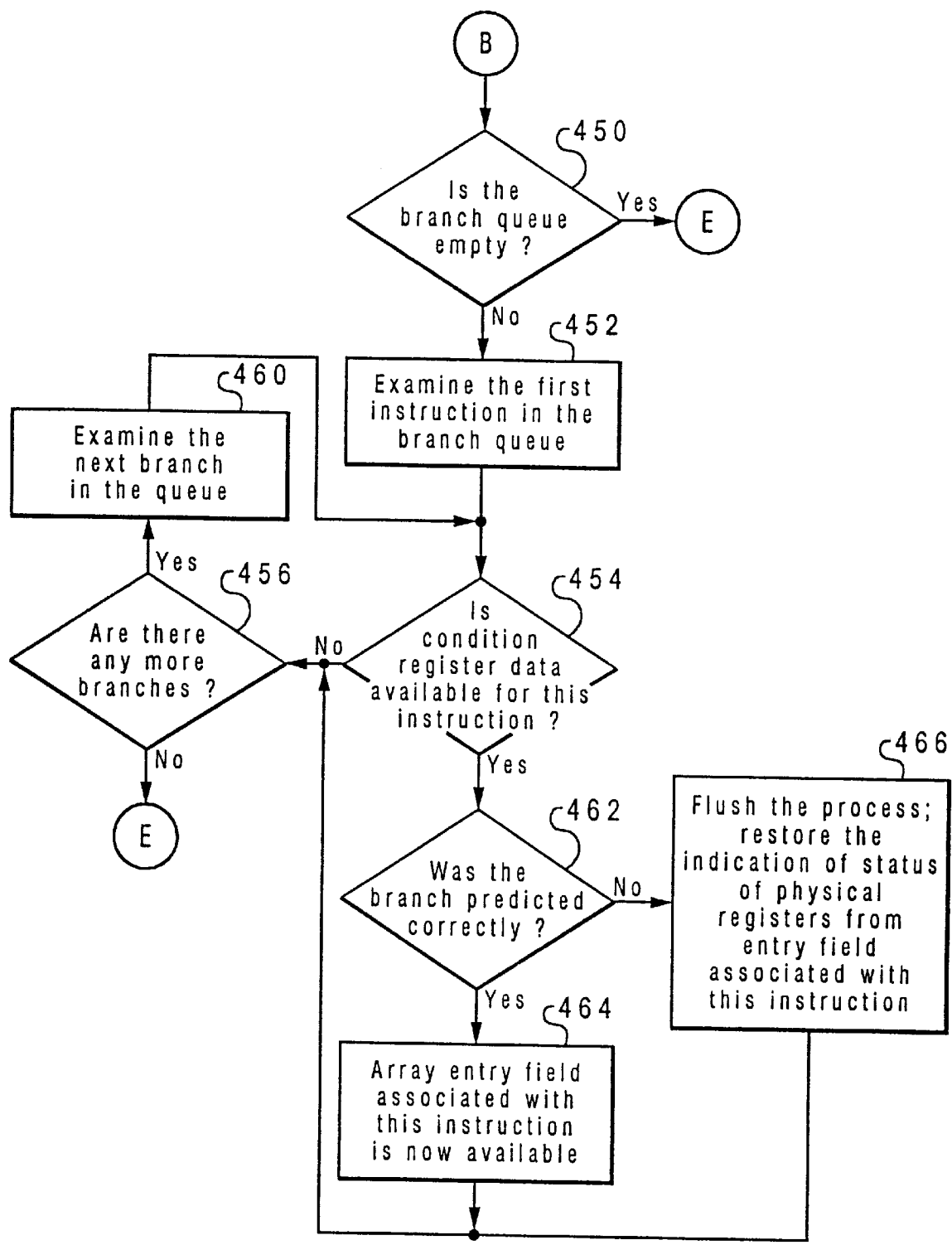
Figure 6C:
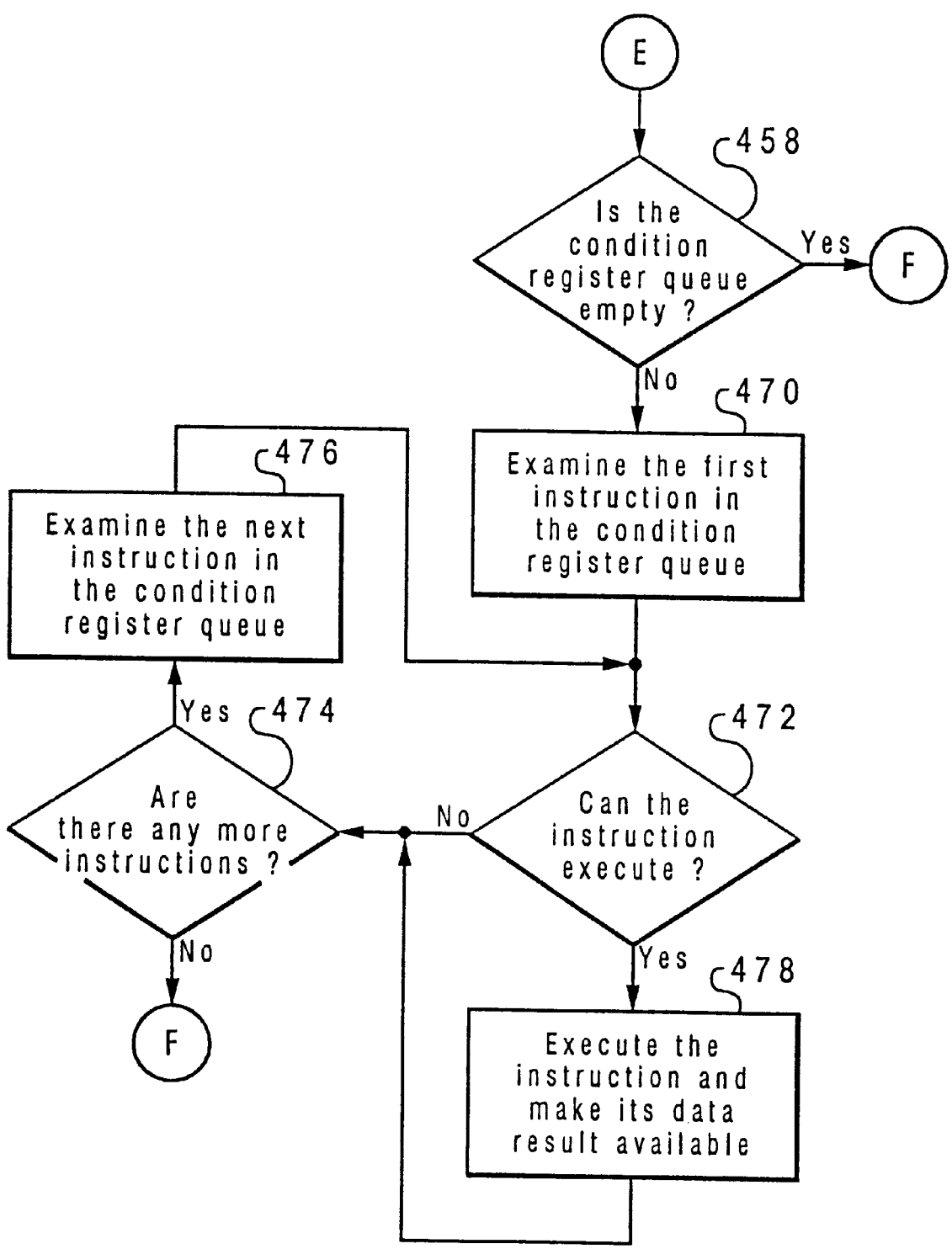
Figure 6D:
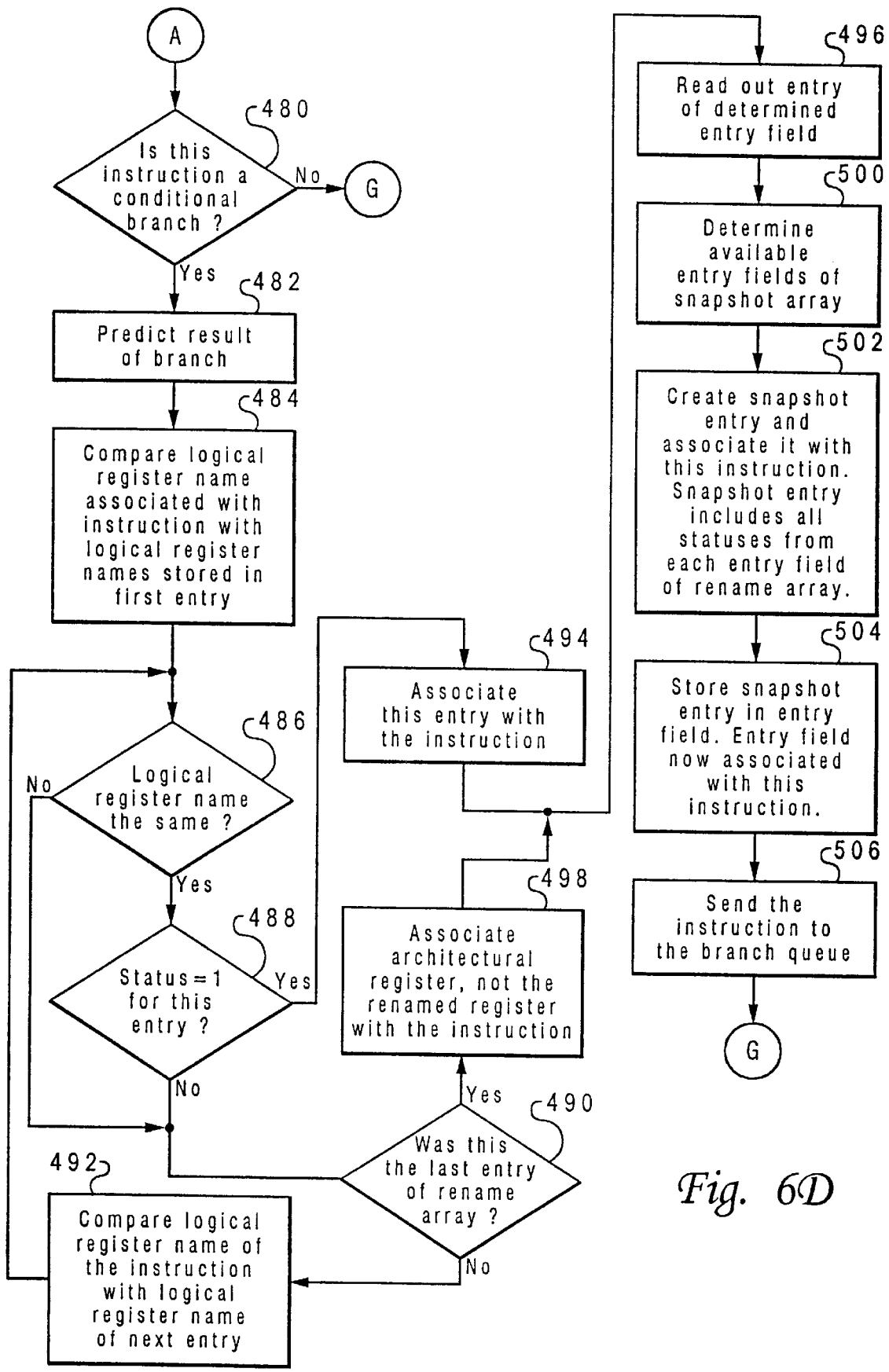

FIG. 5 illustrates a circuit 320 for storing and restoring a single element of array 70. Those skilled in the art will understand that each element of array 70 will be stored by a circuit similar to circuit 320. Output 198 is connected to the drain of N-channel transistor 322. The gate of transistor 322 is connected to the output of AND gate 324. AND gate 324 receives as inputs, signals 326 and 328. Signal 326 is a write enable signal. Signal 326 is a logical "1" if an indication of the status of the physical register associated with the element represented by circuit 320 is to be stored in array 70. AND gate 330 receives signals 332 and 326 as inputs. AND gate 334 receives signals 336 and 326 as inputs. AND gate 338 receives signals 340 and 326 as inputs. The output of AND gate 330 is connected to the gate of transistor 342. The output of AND gate 334 is connected to the gate of transistor 344. The output of AND gate 338 is connected to the gate of transistor 346.

The source of transistor 322 is connected to SRAM cell 348. The drain of transistor 342 is connected to signal 200. The source of transistor 342 is connected SRAM cell 348. The drain of transistor 344 is connected to signal 202. The source of transistor 344 is connected SRAM cell 348. The drain of transistor 346 is connected to signal 204. The source of transistor 346 is connected SRAM cell 348. SRAM cell 348 stores the value of the enabled signal.

Signals 328, 332, 336, and 340 are column enable signals. Signal 328 is a logical "1" if signal 198 is to be stored in SRAM cell 348. Signal 332 is a logical "1" if signal 200 is to be stored in cell 348. Signal 336 is a logical "1" if signal 202 is to be stored in cell 348. Signal 340 is a logical "1" if signal 204 is to be stored in cell 348.

Because entry field 82 has been associated with status before the conditional branch at Instruction 3, signal 332 will be a logical "1" while signals 328, 336, and 340 will be a logical "0". When logic diagram 160 is associated with physical register 7, the value of signal 200 will be stored in cell 348 as represented by element 134. Therefore, element 134 of array 70 will include an indication of status of physical register 7 before initiating processing of Instruction 3 but after initiating processing of Instructions 1 and 2. In a similar manner, for each other physical register, signal 332 will cause an indication of status to be stored in entry field 82.

Those skilled in the art that for each element of array 70, a similar set of signals 198, 200, 202, 204, and 328,332, 336, and 340 must be provided. For example, for physical register 8 a similar logic diagram 160 must be included which will generate signals 100, 102, 104, and 106, depicted in FIG. 3, which are analogous to signals 198, 200, 202, and 204 utilized for physical register 7.

As a further example, in order to enable entry field 84 to include an indication of status of each physical register after Instruction 3 but before the next conditional branch at Instruction 4, a set of signals 108, 110, 112, and 114 must be included which are analogous to signals 328, 332, 336, and 340, respectively. In this manner, signal 332 enables the value of signal 200 to be stored in entry field 134 for physical register 7. Signal 332 also enables the value of signal 102 to be stored in entry field 136 for physical register 8. Because entry field 84 is associated with the second conditional branch at Instruction 4, signal 112, which is associated with Instruction 3, will be a logical "1" while signals 108, 110, and 114 will be a logical "0". Signal 112 enables the value of signal 202 to be stored in element 138, and the value of signal 104 to be stored in element 140.

If the status value stored in SRAM cell 348 is to be restored into array 40, a restore select signal 350 for the element to include a restored status value will be a logical "1". The drain of transistor 352 is connected to SRAM cell 348. The gate of transistor 352 receives signal 350. Signal 354 is generated by the source of transistor 352. Therefore, signal 354 will be the restore status to be included in the appropriate status field of array 40. For entry field 82, when signal 350 is a logical "1", the indication of the status of all physical registers will be copied from entry field 82 into the status field of array 40. For example, when the indication of status stored after Instruction 2 is to be restored in condition register rename array 40, signal 350 will be a logical "1" causing the value stored in element 134 to be copied into status field 54 and the value stored in element 136 to be copied into status field 64.

FIGS. 6A–6D together are a high level flow chart depicting the establishment of an array and the storing of an indication of status of a plurality of physical registers in the array in order to permit concurrent processing of a plurality of instructions of a particular type in accordance with the method and system of the illustrative embodiment.

The process starts as depicted at block 400 and thereafter passes to block 402 which depicts the establishment of a condition register rename array. Next, block 404 illustrates the establishment of a plurality of entry fields within the condition register rename array. Each entry field includes a physical register field, a logical register name field, a status field, a valid field, and a data field. Block 406 then depicts the determination of a plurality of physical registers. Thereafter, block 408 illustrates the association of each entry field within the condition register rename array with a different physical register. Block 410 then illustrates the establishment of a snapshot array. Next, block 412 depicts the establishment of a plurality of entry fields within the snapshot array. Block 414 illustrates the fetching and decoding of an instruction. Next, block 418 illustrates the determination of a logical register name which is associated with the instruction. Next, block 420 depicts the determination of a physical register associated with the instruction.

Block 422 depicts a determination of whether or not this instruction is a condition register setting instruction. If a determination is made that this is a condition register setting instruction, the process passes to block 424 which illustrates a determination of the entry field of the condition register rename array associated with the physical register determined for this instruction. Block 426 then depicts the storage of the logical register name into the logical name field of the entry field determined at block 424 of the condition register rename array. Next, block 428 illustrates the storage of a logical "1" into the status field into this entry field of the condition register rename array. Thereafter, block 430 depicts the storage of a logical "0" into the valid field of this entry field of the condition register rename array. The process then passes to block 432 which depicts the comparison of the logical register name associated with this instruction with the logical register names stored in all other entry fields of the condition register rename array. Block 434 then depicts a determination of whether or not any other entry field includes the logical register name. If a determination is made that another entry field includes the logical register name, the process passes to block 436 which depicts the storage of a logical "0" into the status fields of all other entry fields which include the logical register name stored in that entry field's logical register name field. The process then passes to block 438. Referring again to block 434, if a determination is made that no other entry field includes the logical register name, the process passes to block 438.

Block 438 depicts the sending of the instruction to the condition register queue. Block 440 then illustrates a determination of whether or not this is the last instruction to be dispatched during this cycle. If a determination is made that this is not the last instruction to be dispatched, the process passes to block 414 as depicted through connector F. Referring again to block 440, if a determination is made that this is the last instruction to be dispatched, the process passes back to block 450 as depicted through connector B.

Block 450 illustrates a determination of whether or not the branch queue is empty. If a determination is made that the branch queue is not empty, the process passes to block 452 which depicts the examination of the first instruction in the branch queue. Next, block 454 illustrates a determination of whether or not the condition register data is available for this instruction. If a determination is made that the condition register data is not available for this instruction, the process passes to block 456. Block 456 depicts a determination of whether or not there are any more branch instructions in the branch queue. If a determination is made that there are not more branch instructions in the branch queue, the process passes to block 458 as illustrated through connector E. Referring again to block 456, if a determination is made that there are additional branch instructions in the branch queue, the process passes to block 460 which depicts the examination of the next branch instruction included within the branch queue. The process then passes back to block 454.

Referring again to block 454, if a determination is made that the condition register data is available for this instruction, the process passes to block 462 which illustrates a determination of whether or not the branch instruction was predicted correctly. If a determination is made that the branch instruction was predicted correctly, the process passes to block 464 which depicts making the snapshot array entry field associated with this instruction available. The process then passes back to block 456. Referring again to block 462, if a determination is made that the branch instruction was not predicted correctly, the process passes to block 466 which depicts flushing the process and restoring the indication of the status of the physical registers from the entry field of the snapshot array associated with this instruction. The process then passes back to block 456.

Referring again to block 450, if a determination is made that the branch queue is empty, the process passes to block 458 as illustrated through connector E. Block 458 illustrates a determination of whether or not the condition register queue is empty. If a determination is made that the condition register queue is empty, the process passes back to block 414 as depicted through connector F. Referring again to block 458, if a determination is made that the condition register is not empty, the process passes to block 470 which depicts the examination of the first instruction in the condition register queue. Next, block 472 illustrates a determination of whether or not the instruction can execute. If a determination is made that the instruction can execute, the process passes to block 478. Block 478 depicts the execution of the instruction and the making of the data result of the instruction available. The process then passes to block 474.

Referring again to block 472, if a determination is made that the instruction cannot execute, the process passes to block 474 which illustrates a determination of whether or not there are any more instructions. If a determination is made that there are no more instructions, the process passes to block 414 as illustrated through connector F. Referring again to block 474, if a determination is made that there are more instructions, the process passes to block 476 which depicts the examination of the next instruction in the condition register queue.

Referring again to block 422, if a determination is made that this is not a condition register setting instruction, the process passes to block 480 as illustrated through connector A. Block 480 illustrates a determination of whether or not this is a condition register reading instruction, i.e. a conditional branch instruction. If a determination is made that this is not a conditional branch instruction, the process passes as depicted to block 440. Referring again to block 480, if a determination is made that this instruction is a conditional branch instruction, the process passes to block 482 which illustrates the prediction of the result of this conditional branch. Next, block 484 depicts the comparison of the logical register name associated with the current instruction with the logical register names stored in the first entry field of the condition register rename array. Next, block 486 illustrates a determination of whether or not the logical register names are the same. If a determination is made that the logical register names are the same, the process passes to block 488 which illustrates a determination of whether or not the indication of status stored in the status field for this entry is a logical "1". If a determination is made that the indication is not a "1", the process passes to block 490.

Referring again to block 486, if a determination is made that the logical register names are not the same, the process passes to block 490. Block 490 illustrates a determination of whether or not this is the last entry included within the condition register rename array. If a determination is made that this is the last entry in the rename array, the process to block 492 which depicts the comparison of the logical register name of this instruction with the logical register name of the next entry. The process then passes back to block 486.

Referring again to block 488, if a determination is made that the indication of status stored in this entry is not "1", the process passes to block 494 which depicts the association of this entry with the instruction. The process then passes to block 496. Referring again to block 490, if a determination is made that this is not the last entry included within the rename array, the process passes to block 498 which illustrates an association of the architectural register with this instruction. The renamed register is not associated with this instruction. Thereafter, the process passes to block 496.

Block 496 illustrates the reading out of the entry stored in the determined entry field. Block 500 then depicts the determination of an available entry fields within the snapshot array. Next, block 502 illustrates the creation of a snapshot array entry and the association of this entry with this instruction. The snapshot entry includes all statuses from each entry field of the rename array. Thereafter, block 504 illustrates the storage of the snapshot entry in the entry field. The entry field is now associated with this instruction. Block 506 depicts the sending of the instruction to the branch queue.

While an illustrative embodiment has been particularly shown and described, it will be understood by those skilled in the art that various changes in form and detail may be made therein without departing from the spirit and scope of the illustrative embodiment.

We claim:

1. A method of operating a processing system, comprising:

establishing a condition register within said processing system;

dispatching a first conditional branch instruction during a single cycle of said processing system;

prior to speculatively executing said first conditional branch instruction, storing a first copy of said condition register;

dispatching a second conditional branch instruction during said single cycle of said processing system; and prior to speculatively executing said second conditional branch instruction, storing a second copy of said condition register, wherein multiple copies of said condition register are concurrently maintained so that said first and second conditional branch instructions may be concurrently processed during a single cycle of said processing system.

2. The method of claim 1 further comprising:

during said single cycle, dispatching a third instruction.

3. The method of claim 2 further comprising:

speculatively executing said third instruction after dispatching said third instruction.

4. The method of claim 1 further comprising:

dispatching a third instruction in response to dispatching said first and second instructions.

5. The method of claim 4 further comprising:

speculatively executing said third instruction after dispatching said third instruction.

6. The method according to claim 5, further comprising the step of recovering from a misprediction of one of said dispatched branch instructions while all others of said dispatched instructions are being processed, wherein said processing system continues said processing of all others of said dispatched instructions during said step of recovering.

7. The method according to claim 6, further comprising the steps of:

said first and second conditional branch instructions being associated with said condition register;

associating said first conditional branch instruction with a first of a plurality of physical registers, wherein said condition register is renamed to said first of said plurality of physical registers for said first conditional branch instruction;

associating said second conditional branch instruction with a second of said plurality of physical registers, wherein said condition register is renamed to said second of said plurality of physical registers for said second conditional branch instruction;

establishing a snapshot array having a plurality of entry fields for storing multiple copies of said condition register;

associating said first conditional branch instruction with a first of said plurality of entry fields in said snapshot array, and associating said second conditional branch instruction with a second of said plurality of entry fields in said snapshot array;

immediately prior to processing said first conditional branch instruction, creating a first entry including an indication of a status of said first of said plurality of physical registers, said status indicating whether said first of said plurality of physical registers is a most recently allocated one of said plurality of physical registers to be associated with said condition register;

immediately prior to processing said second conditional branch instruction, creating a second entry including an indication of a status of said second of said plurality of physical registers, said status indicating whether said second of said plurality of physical registers is a most recently allocated one of said plurality of physical registers to be associated with said condition register; and in response to a creation of said first and second entries, storing said first entry in said first plurality of entry fields, and storing said second entry in said second plurality of entry fields.

8. The method according to claim 7, further comprising the steps of:

establishing a condition register rename array having a plurality of entry fields, each of said plurality of entry fields including a status field for storing an indication of a status of one of said plurality of physical registers;

associating each of said plurality of entry fields with a different one of said plurality of physical registers;

associating a condition-setting instruction setting said condition register with one of said plurality of physical registers, wherein said condition register is renamed to said one of said plurality of physical registers for said condition-setting instruction;

creating an entry for one of said plurality entry fields associated with said one of said plurality of physical registers including a status of said one of said plurality of physical registers; and storing said entry in said one of said plurality of entry fields.

9. A processing system, comprising:

a condition resister included within said processing system;

circuitry for dispatching a first conditional branch instruction during a single cycle of said processing system;

prior to speculatively executing said first conditional branch instruction, circuitry for storing a first copy of said condition register;

circuitry for dispatching a second conditional branch instruction during said single cycle of said processing system; and prior to speculatively executing said second conditional branch instruction, circuitry for storing a second copy of said condition register, wherein multiple copies of said condition register are concurrently maintained so that said first and second conditional branch instructions may be concurrently processed during a single cycle of said processing system.

10. The system of claim 9 further comprising circuitry for dispatching a third instruction during said single cycle.

11. The system of claim 10 further comprising circuitry for speculatively executing said third instruction after dispatching said third instruction.

12. The system of claim 9 further comprising circuitry for dispatching a third instruction in response to dispatching said first and second instructions.

13. The system of claim 12 further comprising circuitry for speculatively executing said third instruction after dispatching said third instruction.

* * * * *

UNITED STATES PATENT AND TRADEMARK OFFICE
CERTIFICATE OF CORRECTION

PATENT NO. : 5,974,535
DATED : October 26, 1999
INVENTOR(S) : Peng et al.

It is certified that error appears in the above-identified patent and that said Letters Patent is hereby corrected as shown below:

Column 8, line 46, please change "FIG. 28" to –FIG 2B–.

Signed and Sealed this

Fifth Day of December, 2000

Attest:

Attesting Officer

Q. TODD DICKINSON
Director of Patents and Trademarks

UNITED STATES PATENT AND TRADEMARK OFFICE
CERTIFICATE OF CORRECTION

PATENT NO. : 5,974,535
DATED : October 26, 1999
INVENTOR(S) : Peng et al.

It is certified that error appears in the above-identified patent and that said Letters Patent are hereby corrected as shown below:

On the title page, Assignee, please add --Motorola, Inc., Schaumburg, Illinois--.

Signed and Sealed this

Tenth Day of April, 2001

Attest:

NICHOLAS P. GODICI

Attesting Officer    Acting Director of the United States Patent and Trademark Office